Figure 1:
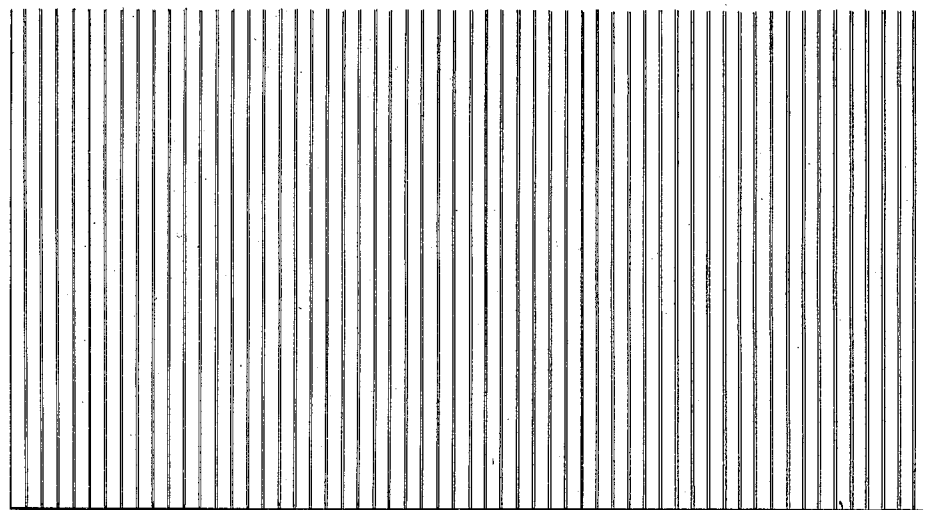
Figure 2:
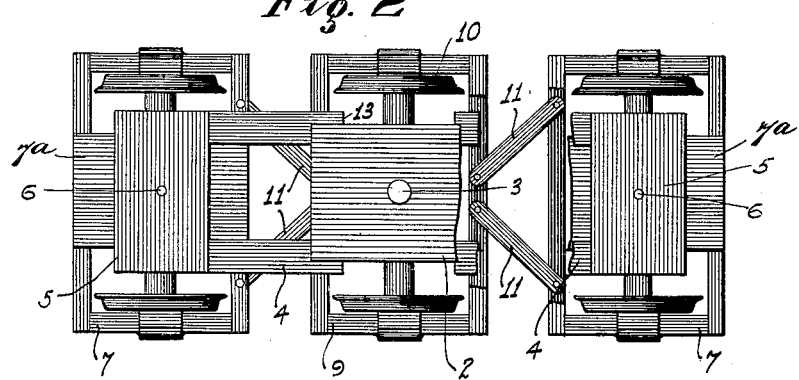

T. H. BURNETT.
CAR TRUCK.
APPLICATION FILED SEPT. 22, 1913.

1,094,524.

Patented Apr. 28, 1914.
2 SHEETS—SHEET 1.

WITNESSES:
Clarence M. Smith
J. B. Webster

INVENTOR.
Thos. H. Burnett
BY
ATTORNEY

T. H. BURNETT.
CAR TRUCK.
APPLICATION FILED SEPT. 22, 1913.
1,094,524.
Patented Apr. 28, 1914.
2 SHEETS—SHEET 2.
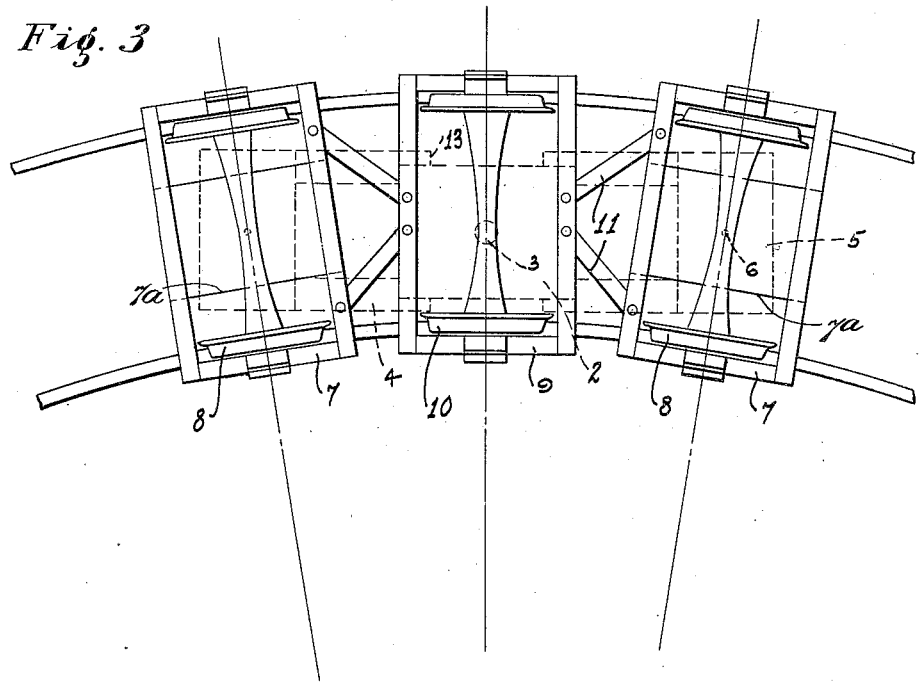
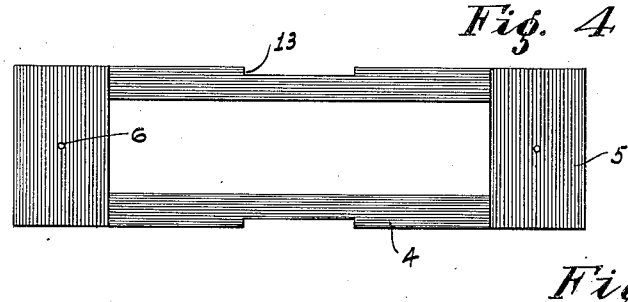
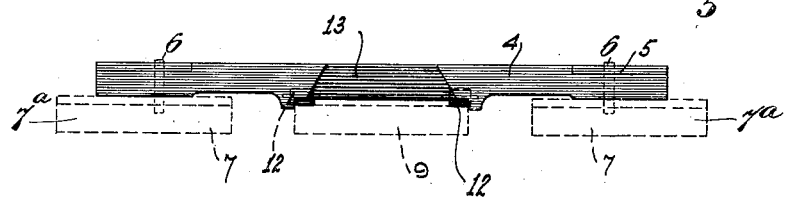
WITNESSES:
INVENTOR.
Thos. H. Burnett
BY
ATTORNEY